US010566873B2

(12) United States Patent
Ishikawa et al.

(10) Patent No.: US 10,566,873 B2
(45) Date of Patent: Feb. 18, 2020

(54) ROTATING ELECTRICAL MACHINE HAVING MEANS TO SECURE PLATING TO COVER A FLOW PASSAGE

(71) Applicant: Hitachi Automotive Systems, Ltd., Hitachinaka-shi, Ibaraki (JP)

(72) Inventors: Toshio Ishikawa, Hitachinaka (JP); Masahiko Honma, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 142 days.

(21) Appl. No.: 15/508,180

(22) PCT Filed: Aug. 17, 2015

(86) PCT No.: PCT/JP2015/072981
§ 371 (c)(1),
(2) Date: Mar. 2, 2017

(87) PCT Pub. No.: WO2016/047310
PCT Pub. Date: Mar. 31, 2016

(65) Prior Publication Data
US 2017/0294820 A1    Oct. 12, 2017

(30) Foreign Application Priority Data
Sep. 25, 2014    (JP) .................. 2014-194623

(51) Int. Cl.
*H02K 5/20* (2006.01)
*H02K 5/06* (2006.01)
*H02K 9/19* (2006.01)

(52) U.S. Cl.
CPC ............... *H02K 5/20* (2013.01); *H02K 5/06* (2013.01); *H02K 9/19* (2013.01)

(58) Field of Classification Search
CPC ............ H02K 5/06; H02K 5/12; H02K 5/128; H02K 5/20; H02K 9/19
(Continued)

(56) References Cited

U.S. PATENT DOCUMENTS 5,731,643 A * 3/1998 Avakian ............... B60K 6/26
310/52
6,160,332 A * 12/2000 Tsuruhara ............ H02K 5/20
310/54
(Continued)

FOREIGN PATENT DOCUMENTS

JP    2004-364429 A    12/2004
JP    2010-38356 A    2/2010
(Continued)

OTHER PUBLICATIONS

Tamaoka et al., English Machine Translation of JP2011-027265, Feb. 2011.*
(Continued)

*Primary Examiner* — Jermele M Hollington
*Assistant Examiner* — Rashad H Johnson
(74) *Attorney, Agent, or Firm* — Crowell & Moring LLP

(57) ABSTRACT

Provided is a rotating electrical machine including a housing in which a flow passage of cooling liquid can be easily formed and airtightness and productivity are high. A rotating electrical machine is configured to include a housing which is provided with a part of a flow passage of cooling liquid, a stator which is disposed on an inner circumferential side of the housing and includes a stator winding, and a rotor which is rotatably supported to an inner circumferential side of the stator with a gap between the stator and the rotor and the flow passage of the cooling liquid includes an annular groove having an open surface on at least one side of an axial direction of the housing and a plate provided to cover the
(Continued)

open surface. Preferably, the housing and the plate are configured to be joined by welding or an adhesive material. In addition, roughening processing or chemical processing may be performed on parts of the housing and the plate and the housing and the plate may be configured to be joined by a resin.

8 Claims, 12 Drawing Sheets

(58) Field of Classification Search
USPC .............................................. 310/52, 54, 64
See application file for complete search history.

(56) References Cited

U.S. PATENT DOCUMENTS

| | | | | |
|---|---|---|---|---|
| 6,633,098 | B2 * | 10/2003 | Inaba | H02K 5/18 310/52 |
| 2003/0127920 | A1 * | 7/2003 | Yamazaki | H02K 11/046 310/58 |
| 2004/0135443 | A1 * | 7/2004 | Tajima | H02K 5/20 310/68 D |
| 2010/0181873 | A1 * | 7/2010 | Kern et al. | B22C 7/026 310/418 |
| 2011/0095632 | A1 | 4/2011 | Tsutsui | |
| 2012/0267969 | A1 * | 10/2012 | Iwamoto | H02K 5/15 310/54 |
| 2012/0267970 | A1 * | 10/2012 | Filip | H02K 1/20 310/54 |
| 2013/0342045 | A1 * | 12/2013 | Matsuki | H02K 5/20 310/54 |
| 2015/0207378 | A1 * | 7/2015 | Buttner | H02K 5/20 310/54 |
| 2016/0118858 | A1 * | 4/2016 | Ojima | H02K 5/20 310/52 |
| 2017/0110928 | A1 * | 4/2017 | Koda | F16C 35/06 |
| 2018/0026493 | A1 * | 1/2018 | Jung | H02K 5/24 310/52 |

FOREIGN PATENT DOCUMENTS

| | | |
|---|---|---|
| JP | 2010-93984 A | 4/2010 |
| JP | 2011-27265 A | 2/2011 |
| JP | 2011-205763 A | 10/2011 |
| JP | 2014-87231 A | 5/2014 |

OTHER PUBLICATIONS

International Search Report (PCT/ISA/210) issued in PCT Application No. PCT/JP2015/072981 dated Nov. 10, 2015 with English translation (5 pages).

Japanese-language Written Opinion (PCT/ISA/237) issued in PCT Application No. PCT/JP2015/072981 dated Nov. 10, 2015 (4 pages).

* cited by examiner

ROTATING ELECTRICAL MACHINE HAVING MEANS TO SECURE PLATING TO COVER A FLOW PASSAGE

TECHNICAL FIELD

The present invention relates to a rotating electrical machine, particularly, a rotating electrical machine including a housing provided with a flow passage of cooling liquid.

BACKGROUND ART

Recently, with increasing demand for electronic apparatuses in vehicles, applications of an HEV or an EV to large-sized vehicles and the like, needs for a high output in a rotating electrical machine such as a generator and a motor are high and a heating value of a stator winding or a rotor increases, so that measures against shortening of a life due to a temperature rise and the like become problems.

A method (liquid cooling type) of providing a cooling flow passage in a housing covering a stator is known as a method of cooling the rotating electrical machine and can effectively cool the stator in particular.

For the housing provided with the cooling flow passage, there are many casting products manufactured by a manufacturing method such as low pressure casting. In the manufacturing method, a premolded core (casting mold) is set to a mold, the core is pulverized and extracted after casting, and a cavity, that is, the flow passage is formed in the housing. This method has a problem in that productivity is low and a manufacturing cost is high.

With respect to the problems, PTL 1 discloses a two division structure in which a housing having an annular flow passage where a side of one direction of an axial direction is opened is provided, an opening end is closed by a bracket, and a cooling flow passage where cooling liquid circulates is formed, for the purpose of realizing a low cost and a simple structure. Because manufacturing is enabled using die-casting as a manufacturing method, a housing having a low cost and high productivity can be manufactured, as compared with the case of using the low pressure casting.

In addition, PTL 2 discloses a structure in which a hole penetrated in an axial direction is provided in a casing, the casing is interposed by brackets from both ends, and a flow passage of cooling water is formed inside.

CITATION LIST

Patent Literature

PTL 1: Japanese Patent Application No. 2004-364429
PTL 2: Japanese Patent Application Laid-Open No. 2010-093984

SUMMARY OF INVENTION

Technical Problem

In the conventional housing provided with the flow passage disclosed in PTL 1 or PTL 2, the structure is simple and cheap. However, it is necessary to secure airtightness by a sealing structure using packing and bolt fastening. For this reason, an increase in the number of components and the number of production processes when the flow passage of the cooling liquid is formed and a quality of sealing become problems.

Accordingly, an object of the present invention is to provide a rotating electrical machine including a housing in which a flow passage of cooling liquid can be easily formed and airtightness and productivity are high.

Solution to Problem

To resolve the above problems, for example, configurations described in claims are adopted.

Advantageous Effects of Invention

The present application includes multiple means to solve the above problem, and examples of the means include a rotating electrical machine, including: a housing which is provided with a part of a flow passage of cooling liquid; a stator which is disposed on an inner circumferential side of the housing and includes a stator winding; and a rotor which is rotatably supported to an inner circumferential side of the stator with a gap between the stator and the rotor, wherein the flow passage of the cooling liquid includes an annular groove having an open surface on at least one side of an axial direction of the housing and a plate provided to cover the open surface.

According to the present invention, a rotating electrical machine including a housing in which a flow passage of cooling liquid can be easily formed and airtightness and productivity are high can be provided.

Other objects, configurations, and effects will become apparent from the following description of embodiments.

DESCRIPTION OF EMBODIMENTS

Embodiments of the present invention are hereinafter described using the drawings.

In the following description, a driving motor of a vehicle is used as an example of a rotating electrical machine. In addition, in the following description, an "axial direction" shows a direction along a rotation axis of the rotating electrical machine. A "circumferential direction" shows a direction along a rotation direction of the rotating electrical machine. A "radial direction" snows a radial direction (a direction of a radius) when the rotation axis of the rotating electrical machine is set as a center. An "inner circumferential side" shows an inner side (inner diameter side) of the radial direction and an "outer circumferential side" shows a reverse direction thereof, that is, an outer side (outer diameter side) of the radial direction.

First Embodiment

Figure 1:
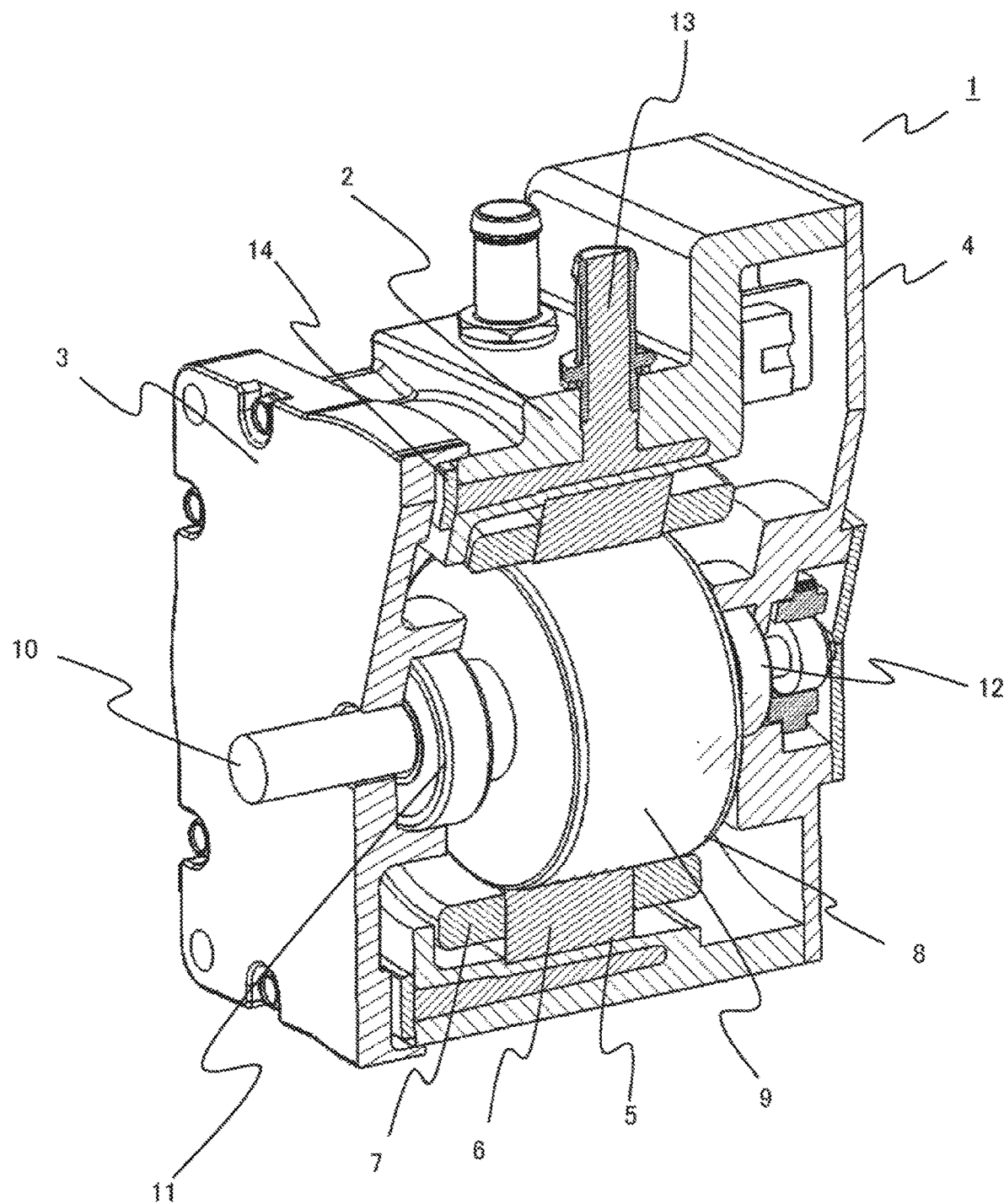
FIG. 1 is a cross-sectional view illustrating an entire configuration of a rotating electrical machine according to a first embodiment.

First, a rotating electrical machine according to this embodiment will be described using FIGS. 1 and 2.

A driving motor to be the rotating electrical machine includes a rotor 8 and a stator 5. The rotor 8 includes a rotor core 9 in a center portion of a shaft 10 and a plurality of magnets (not illustrated in the drawings) are disposed on the rotor core 9. The rotor core 9 includes a laminated steel sheet configured by molding electromagnetic steel sheets having a thickness of about 0.2 to 0.5 mm by punching and laminating the molded electromagnetic steel sheets.

The rotor 8 is disposed on an inner circumferential side of the stator 5 to face the stator 5 with a small gap between the rotor 8 and the stator 5. The shaft 10 is inserted into inner rings of a front bearing 11 and a rear bearing 12 and the rotor 8 is rotatably supported.

The stator 5 is configured using a stator core 6 and a stator winding 7. In the stator core 6, a plurality of thin steel sheets formed annularly are laminated, an inner circumferential side is provided with protruding teeth, and slots are formed between the individual teeth. The stator winding 7 of each phase is wound around each slot and is mounted.

A center housing 2 is disposed on an outer circumferential side of the stator 5 and fixes the stator 5 by shrinkage fitting or the like. Both ends of the center housing 2 are interposed by a front bracket 3 and a rear bracket 4 to cover the stator 8 and the rotor 5.

The front bearing and the rear bearing are mounted on the front bracket and the rear bracket, respectively, and the shaft is inserted into inner circumferential surfaces thereof and supports the rotor rotatably.

Next, the center housing 2 used in this embodiment will be described using FIGS. 3 to 6.

Figure 3:
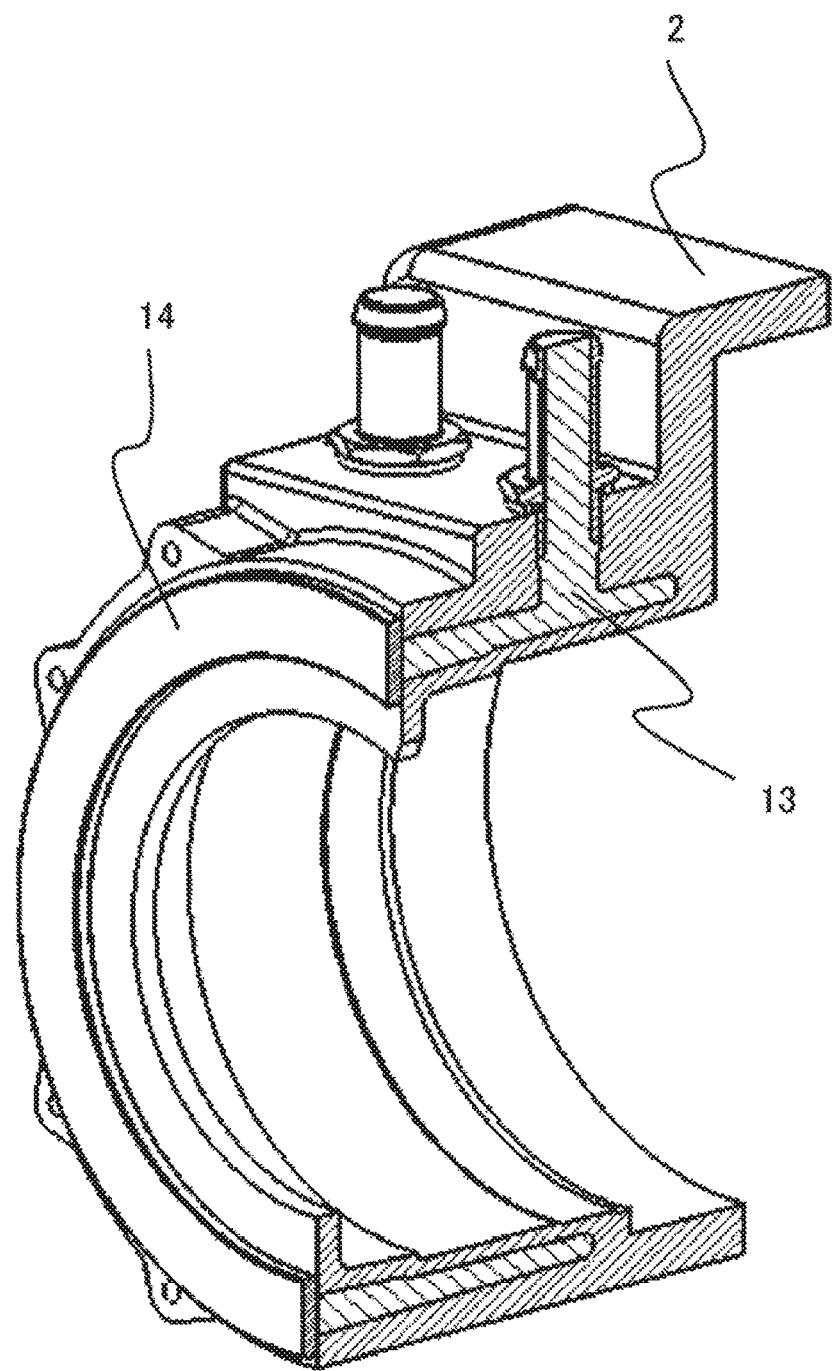
FIG. 3 is a configuration diagram of a flow passage by a center housing according to the first embodiment.
Figure 4:
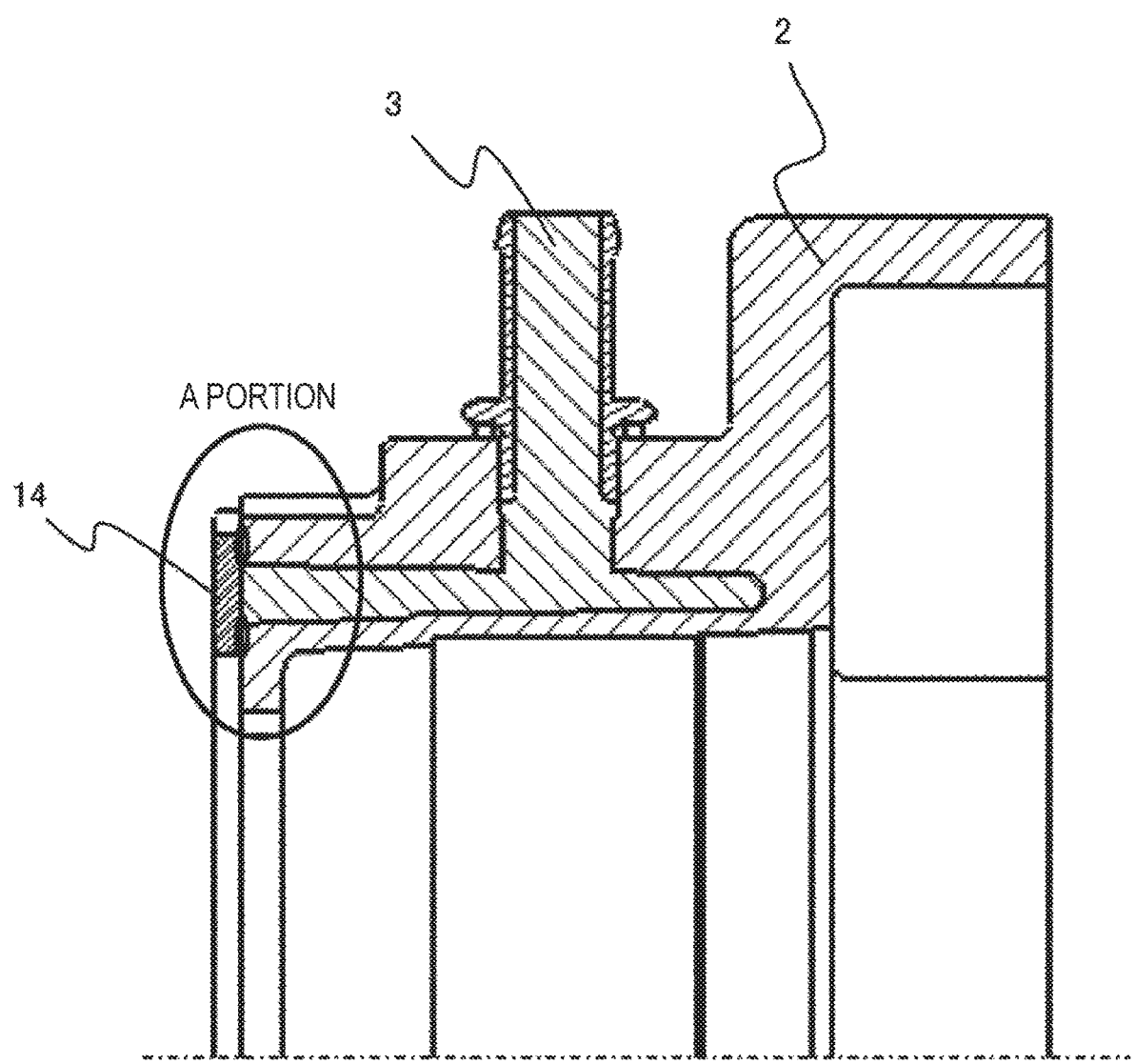
FIG. 4 is a cross-sectional view of the center housing according to the first embodiment.

As illustrated in FIG. 3, an annular groove which becomes a part of a flow passage 13 of cooling liquid and in which one direction of an axial direction becomes an open surface is formed, in the center housing 2. A plate 14 is disposed to cover the open surface and the groove of the center housing 2 becomes a sealed space to be the flow passage 13 of the cooling liquid.

Figure 2:
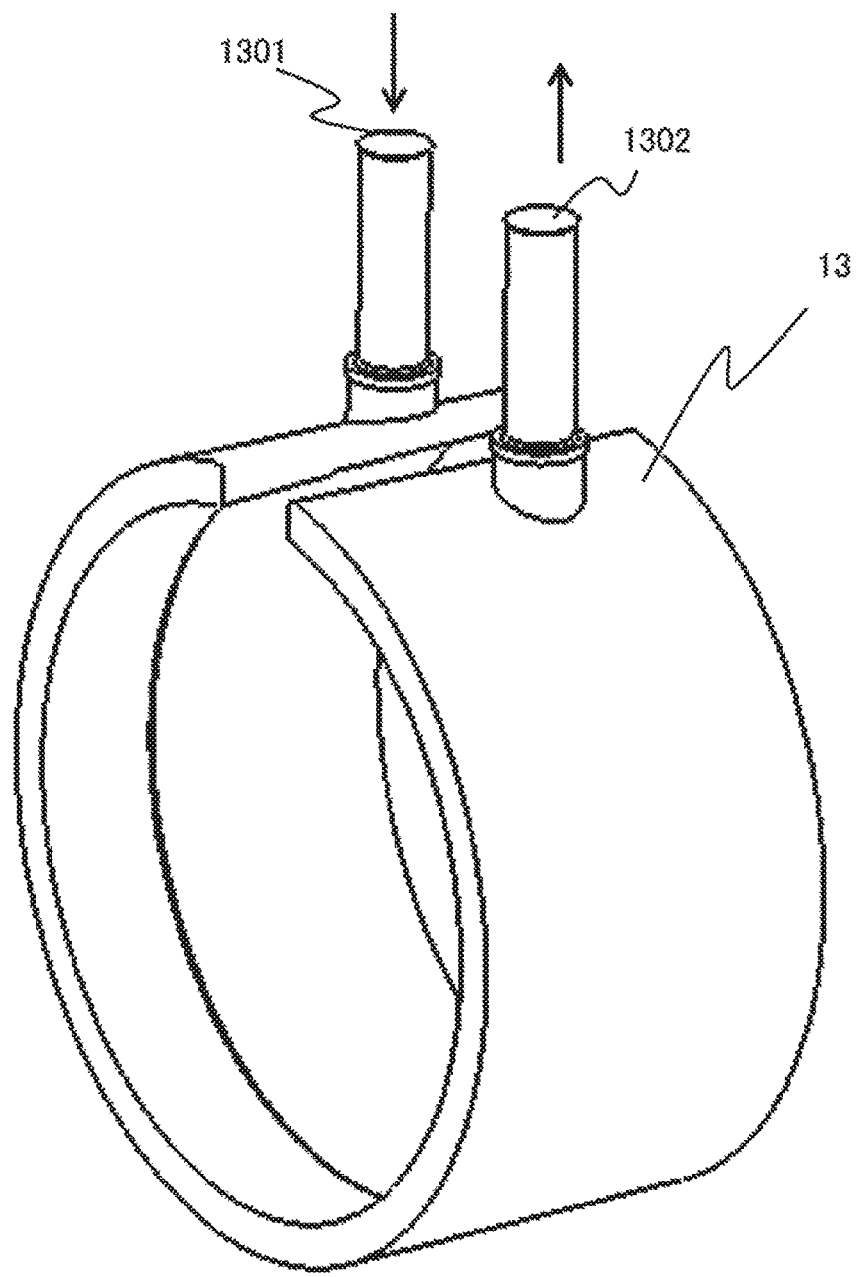
FIG. 2 is a perspective view of a flow passage portion in a housing according to the first embodiment.

The flow passage 13 of the cooling liquid formed using the center housing 2 and the plate 14 has a cylindrical shape, is partitioned between an inlet 1301 and an outlet 1302 of the flow passage, and is formed in a C shape of a belt shape to enable one side passing, as illustrated in FIG. 2. The cooling liquid is injected from the inlet 1301 of the flow passage, flows to go around outer circumference of the stator 5, cools the stator, and is discharged from the outlet 1302.

The plate 14 is made of a thin sheet, has a ring shape, and has a width of a radial direction enabling closing of the open surface of the center housing 2. In this embodiment, the width of the radial direction of the plate 14 is set such that the plate 14 completely closes the open surface of the center housing 2.

For a material of the plate 14, the same material as the center housing 2, particularly, a material having the same linear expansion coefficient is preferable. The center housing 2 according to this embodiment is aluminum die-cast and a material thereof is ADC12. For this reason, the material of the plate 14 is preferably aluminum, particularly, ADC12 to be the same material. By setting the materials of the plate 14 and the center housing 2 equally, stress due to a temperature change by a use environment temperature of a vehicle, a drive condition and the like can be alleviated and strength of a joining portion is maintained.

In the related art, packing is disposed at a position of a boundary portion with a cooling flow passage between the plate 14 or the front bracket and the center housing, fixing is performed by a bolt to generate a surface pressure in the packing from the axial direction, and airtightness between the plate 14 and the center housing 2 is secured.

In this embodiment, the plate 14 and the center housing 2 are joined using welding or an adhesive material to secure the airtightness of the flow passage of the cooling liquid. As a result, the airtightness of the plate 14 and the center housing 2 can be secured without using the packing, the bolt or the like and reduction in the number of components and improvement of productivity can be realized.

Figure 5:
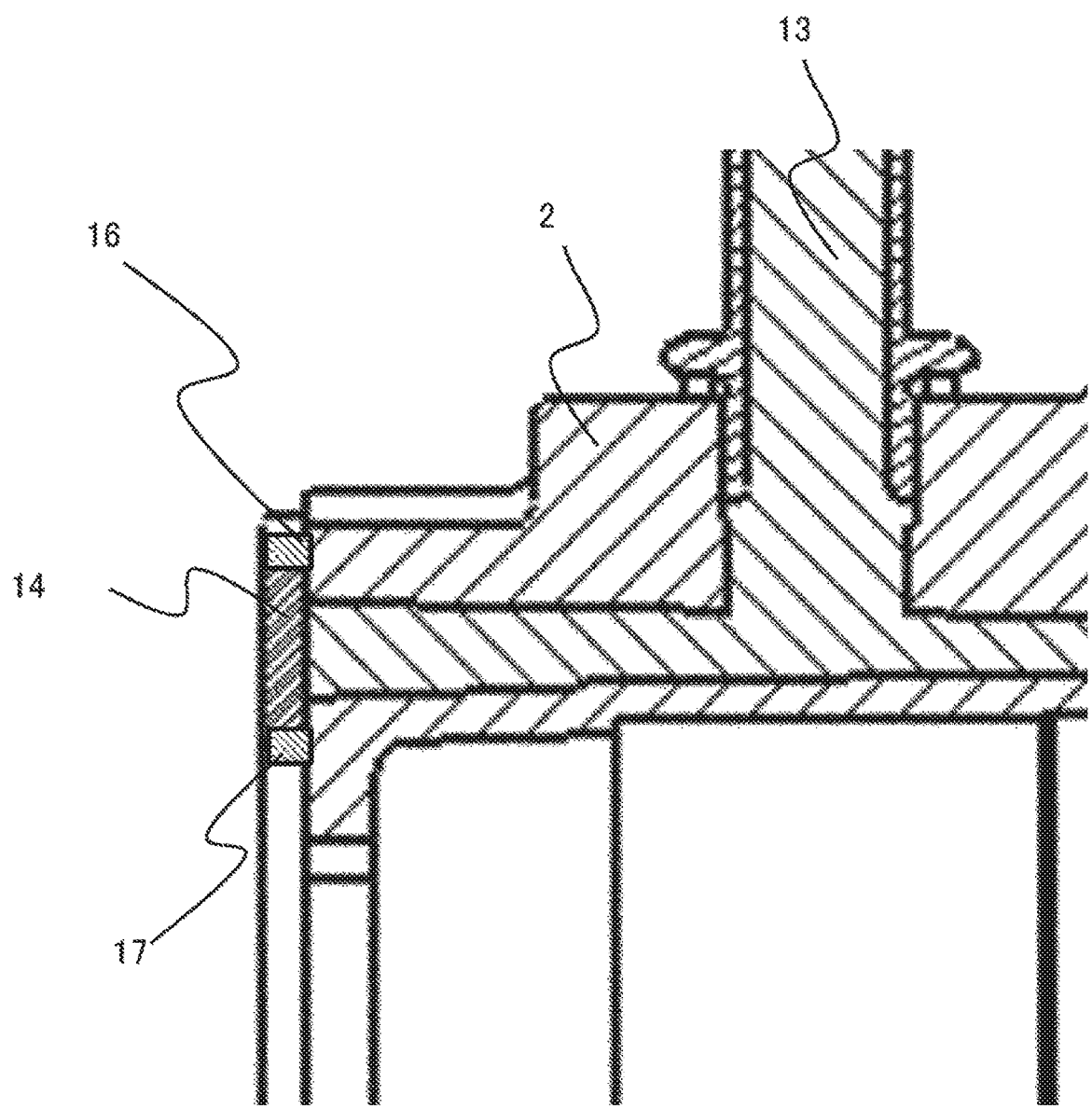
FIG. 5 is an enlarged view of an A portion of FIG. 4.

When joining is performed by the welding, as illustrated in FIG. 5, each of an outer circumferential side 16 and an inner circumferential side 17 of the plate 14 and a wall portion of the center housing 2 are welded along a circumferential direction and the airtightness can be secured. As a welding method, laser welding, electron beam welding or the like is used. In addition, an installation surface of the plate 14 is a plane and the plate 14 exists on only one side (the front side and the open surface of the groove of the center housing 2) of the axial direction. Therefore, work efficiency at the time of welding is improved as compared with the case in which a welding portion exists on both sides of the axial direction.

Figure 6:
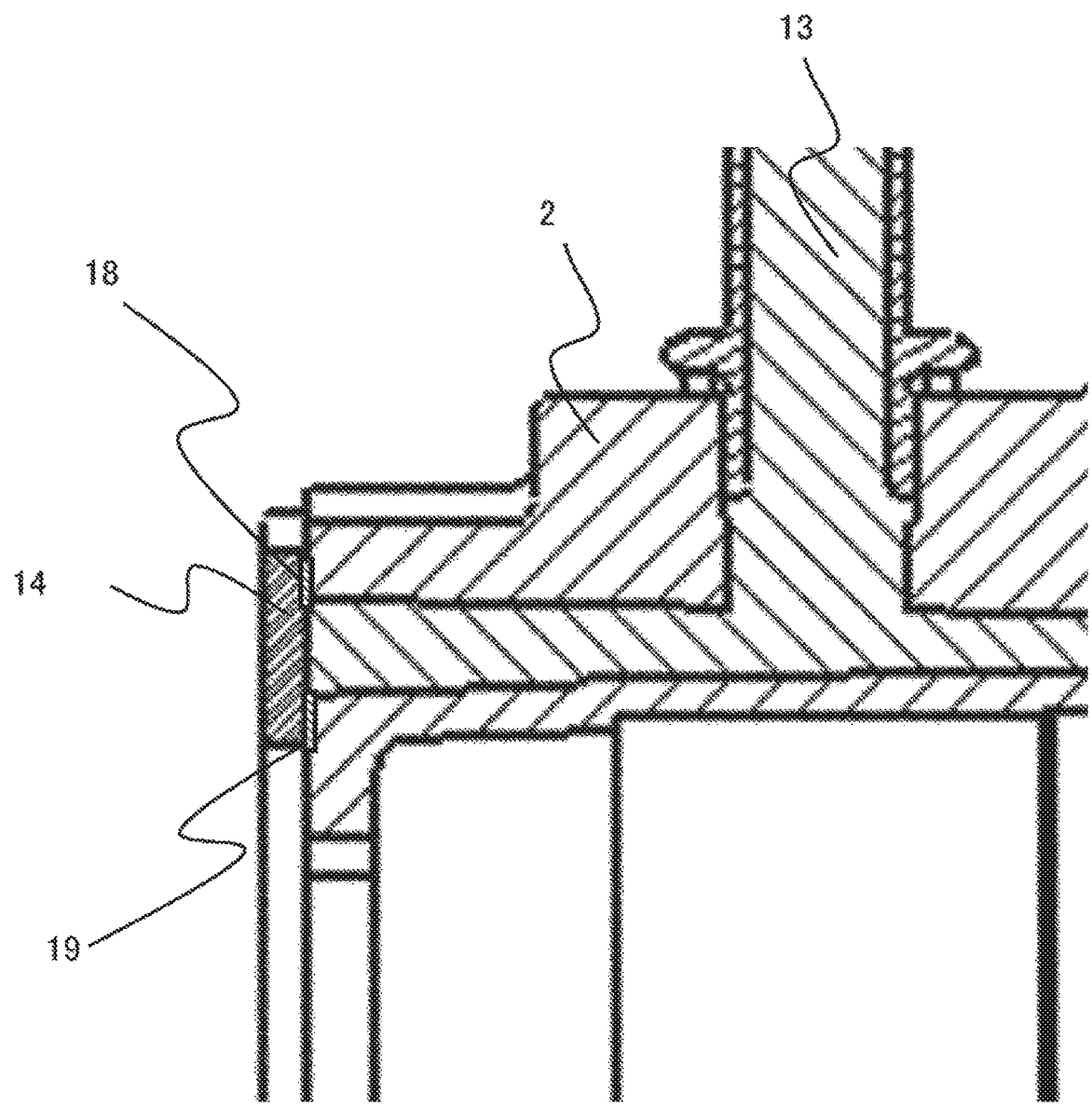
FIG. 6 is an enlarged view of the A portion of FIG. 4.

When joining is performed by the adhesive material, as illustrated in FIG. 6, the adhesive material is applied to an outer circumferential side boundary portion 18 and an inner circumferential side boundary portion 19 of the center housing 2 and the plate 14 and is hardened. As a result, the airtightness of the center housing 2 and the plate 14 can be secured and the flow passage of the cooling liquid can be formed. As the adhesive material, an adhesive material such as an epoxy adhesive material having relatively high heat resistance is preferable.

In the related art, the bracket functions as a lid to seal the cooling flow passage. The bracket has a function of fixing the rotating electrical machine to the outside of the rotating electrical machine (for example, vehicle). In addition, because the bracket also has a function as an attachment portion of other components, the bracket has a function as a strength member in addition to the function as the lid for sealing.

In this embodiment, the plate 14 has only a function of sealing the cooling flow passage. The attachment to the outside of the rotating electrical machine is performed by the front bracket 3 fastened to the center housing 2. For this reason, a structure in which stress such as a vibration is not applied directly to the plate 14 and a joining surface of the plate 14 and the center bracket 2 is realized. By this structure, a high-quality flow passage of the cooling liquid can be secured.

In this embodiment, the open surface of the flow passage portion 13 of the cooling liquid of the center housing 2 is formed on the front side. However, even when the open surface is formed on the rear side, the same effect is obtained.

As described above, according to this embodiment, the flow passage of the cooling liquid of the housing can be easily formed. In addition, because the airtightness of the flow passage of the cooling liquid can be secured without using the packing or the like, the number of components can be reduced. Therefore, a nigh-quality liquid cooling type rotating electrical machine in which a manufacturing cost is low and productivity is nigh can be realized.

Second Embodiment

Another embodiment of the present invention will be described using FIGS. 7 to 10. Explanation of the same portion as the configuration described in the first embodiment is omitted.

Figure 7:
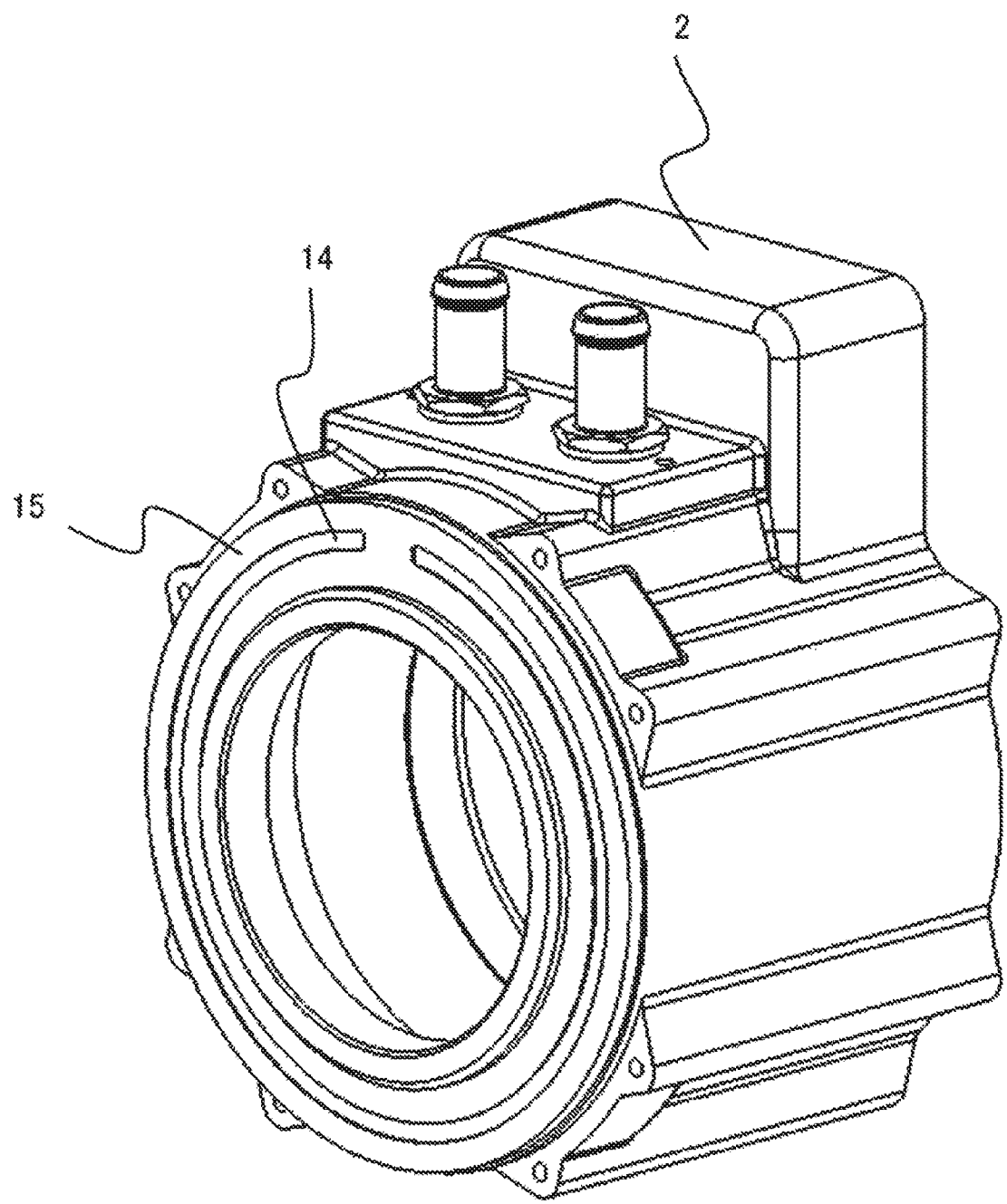
FIG. 7 is a perspective view of a center housing according to a second embodiment.
Figure 8:
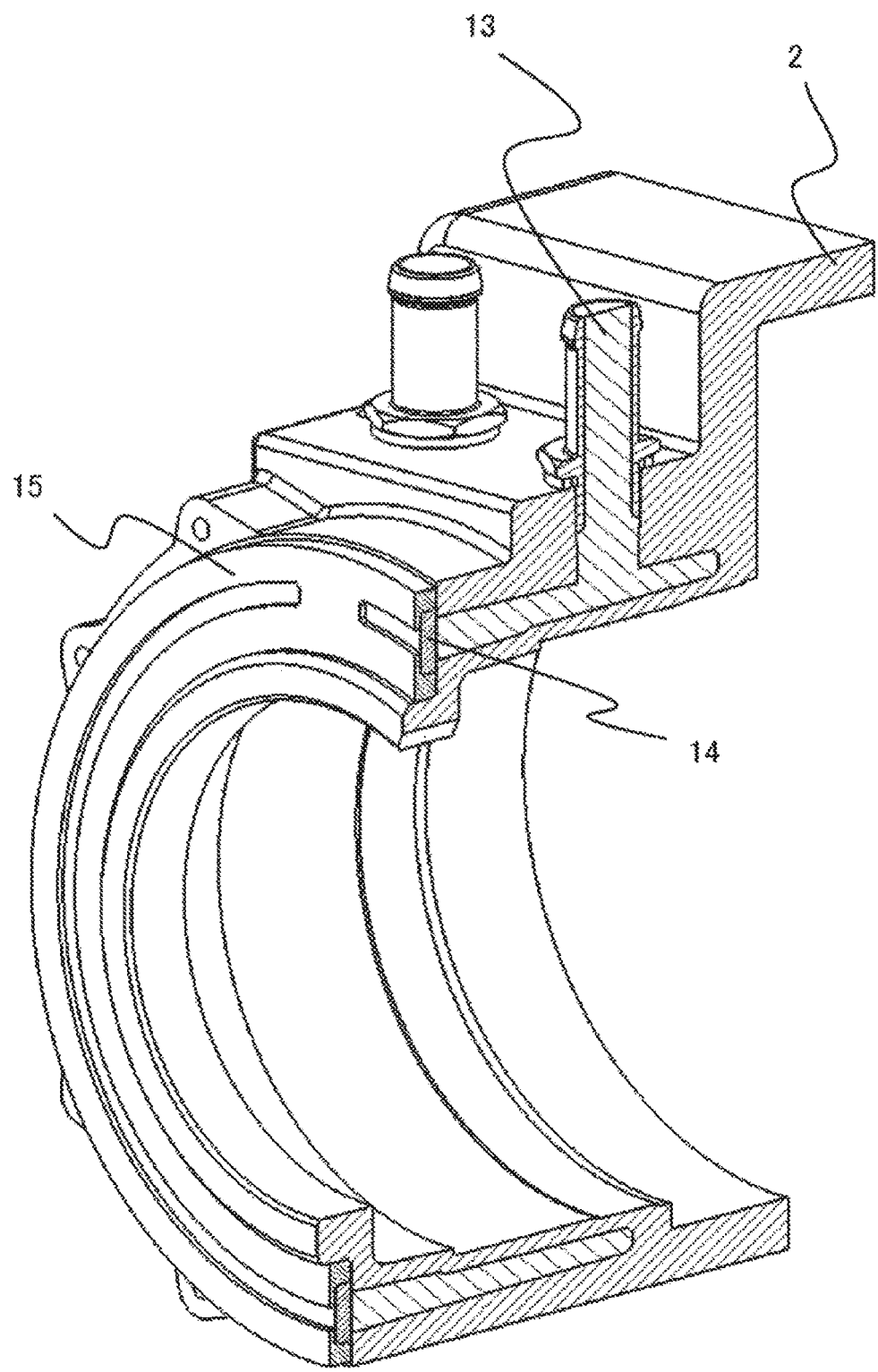
FIG. 8 is a cross-sectional view of the center housing according to the second embodiment.

FIG. 7 is a perspective view of a center housing 2 according to this embodiment and FIG. 8 is a cross-sectional view thereof. An annular groove which becomes a part of a flow passage 13 of cooling liquid and in which one direction of an axial direction becomes an open surface is formed in the center housing 2 and a plate 14 is disposed to cover the open surface. As a result, the groove of the center housing 2 becomes a sealed space to be the flow passage 13 of the cooling liquid.

A boundary portion of the plate 14 and the center housing 2 is covered with a resin 15. By this configuration, the plate 14 and the center housing 2 are joined by the resin 15. The resin 15 may be provided to cover the boundary portion of the plate 14 and the center housing 2. However, to increase joining strength, the resin 15 may be formed to crosslink with a part of an end face of the axial direction of the plate 14 and a part of an end face of the axial direction of the center housing 2, as illustrated in FIG. 8.

The resin 15 is molded at one time by insert molding to cover a part of the plate 14 and a part of the center housing 2. In a state in which the plate 14 is set to the open surface of the center housing 2 and the flow passage portion is sealed, the boundary of the center housing 2 and the plate 14 is closed including the plate 14, and resin molding is performed in a shape in which a joining surface of the resin 15 and the plate 14 and the center housing 2 is secured, so that the resin 15 can be easily manufactured.

The resin 15 may be previously molded and the plate 14 and the center housing 2 may be joined to the molded resin 15.

For the joining surface of the resin 15 and the plate 14 and the center housing 2, a constant area is secured. This is because there is a proportional relation between the area of the joining surface and the joining strength.

For a material of the resin 15, a resin having high heat resistance such as PPS and PEEK is preferable.

Generally, it is known that the resin and a metal are hard to stick to each other and the joining force is weak. In this embodiment, roughening processing is performed on surfaces (joining surfaces with the resin 15) of the center housing 2 and the plate 14 to join the resin 15 and the center housing 2 and the plate 14. The roughening processing is processing for providing minute grooves on a surface of a target material and forming minute uneven portions.

Figure 9:
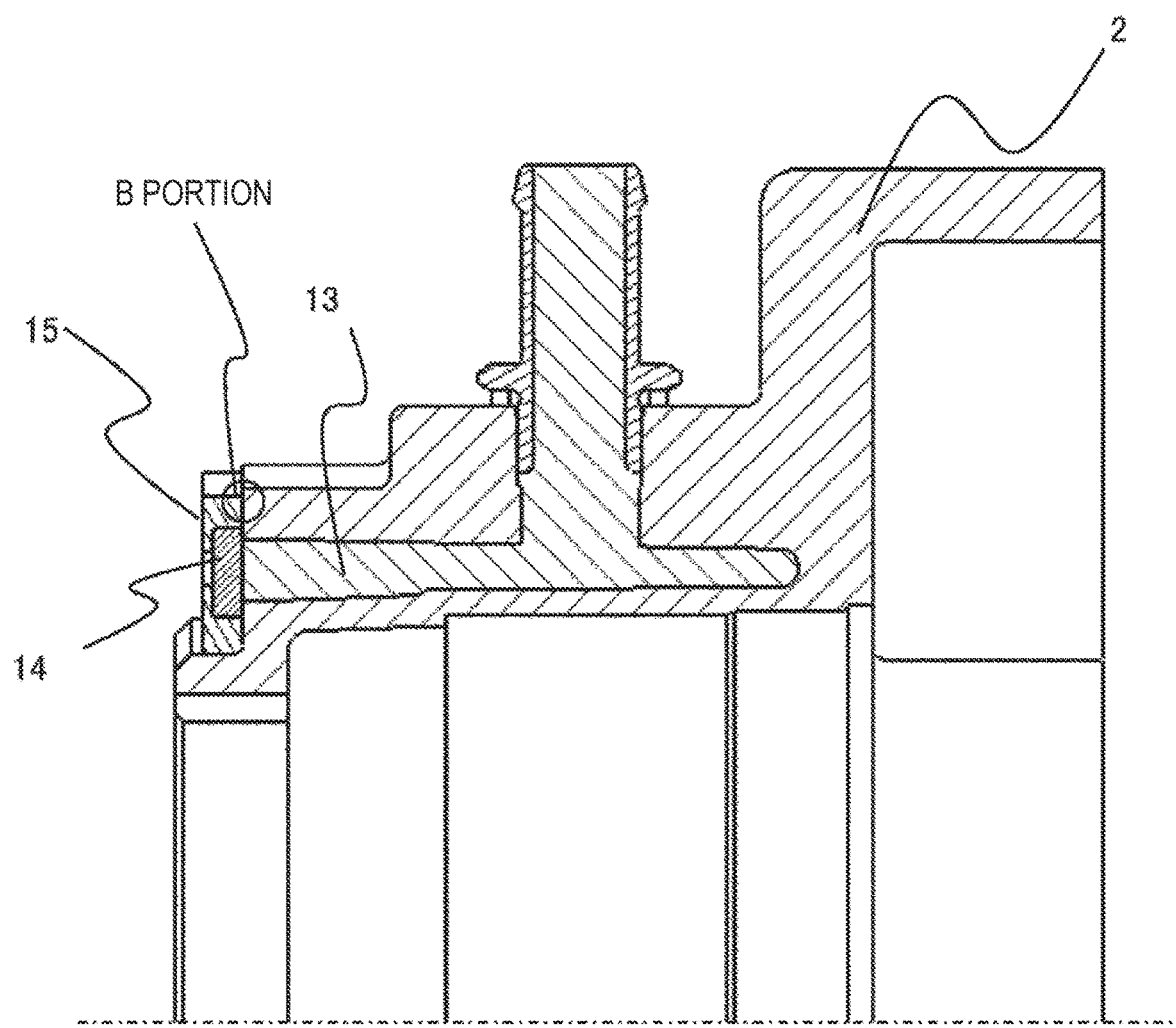
FIG. 9 is a cross-sectional view of the center housing according to the second embodiment.
Figure 10:
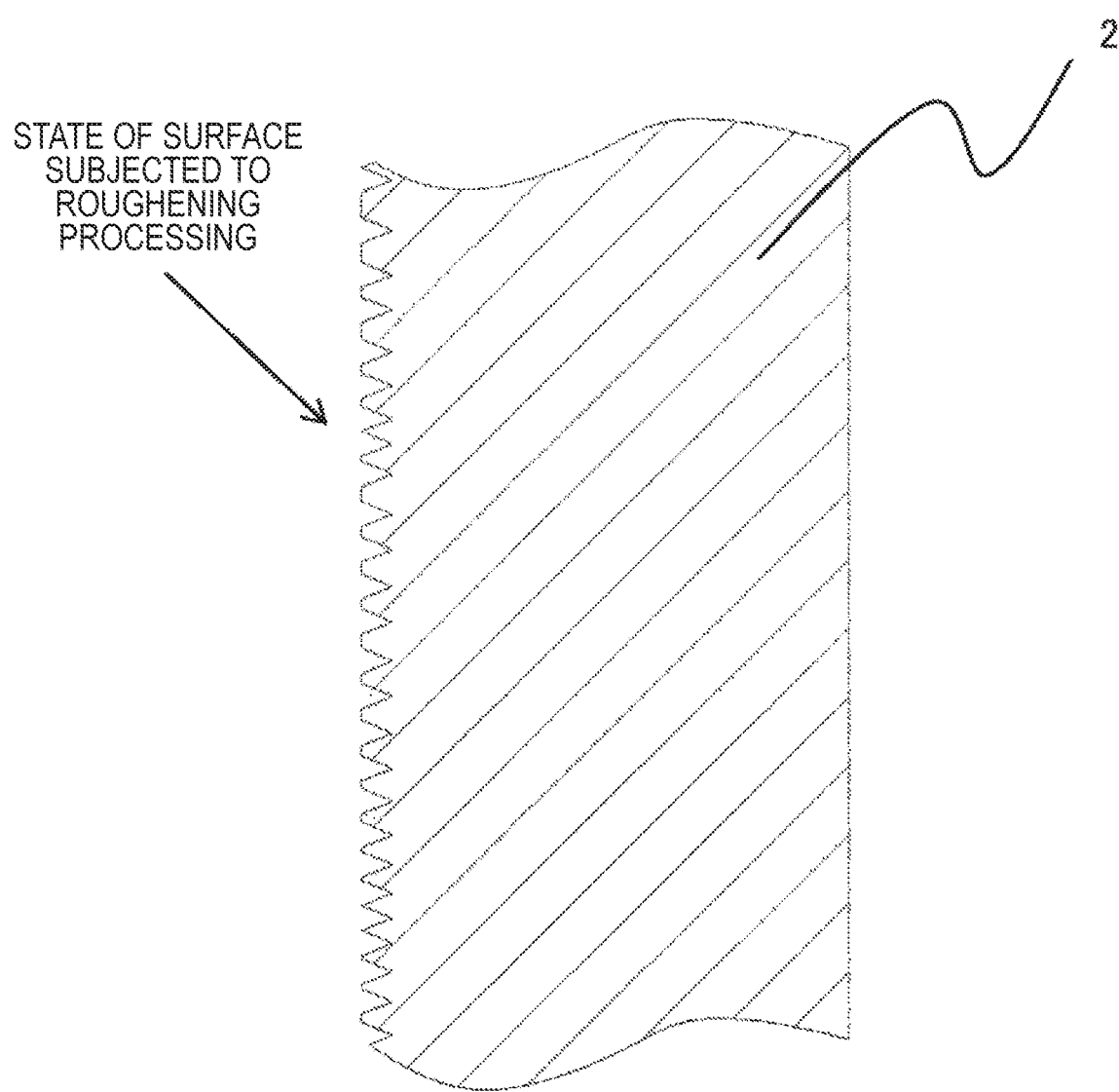
FIG. 10 is an enlarged view of a B portion of the center housing of FIG. 9.

The roughening processing will be described using FIGS. 9 and 10. FIG. 9 is a cross-sectional view of the center housing 2 and FIG. 10 is an enlarged view of a B portion (joining surface of the center housing 2 and the resin 15) of FIG. 9. As illustrated in FIG. 10, a plurality of minute uneven portions are formed on the surface (joining surface with the resin 15) of the center housing 2 subjected to the roughening processing. Although not illustrated in the drawings, a plurality of minute uneven portions are formed on the surface (joining surface with the resin 15) of the plate 14, similar to the center housing 2 illustrated in FIG. 10.

After the roughening processing is performed on the center housing 2 and the plate 14, insert molding of the resin 15 is performed, the resin 15 flows to the groove portions provided by the roughening processing, and the joining strength of the resin 15 and the plate 14 and the center housing 2 can be greatly improved by an anchor effect. As a result, airtightness of the flow passage 13 of the cooling liquid can be improved.

As a method of the roughening processing, there are a method using mechanical processing, a method using laser processing, and a method using a chemical drug such as etching.

When the roughening processing is used, it is important to cause the resin 15 to flow to the minute grooves formed by the roughening processing performed on the surfaces of the center housing 2 and the plate 14. For this reason, a material of the resin 15 preferably has a grade of high fluidity.

As a different method of surface processing for improving the joining strength, there is a method of performing joining using a chemical joining method. In the chemical joining method, chemical processing is performed on the surfaces (joining surfaces with the resin 15) of the center housing 2 and the plate 14 and resin molecules and a portion subjected to the chemical processing are reacted with each other using thermal energy at the time of the insert molding. As a result, the resin 15 and the center housing 2 and the plate 14 are chemically joined at a molecular level. In this method, because the resin 15 and the center housing 2 and the plate 14 are chemically joined at a boundary portion, a flow passage of cooling liquid of high airtightness can be realized.

After the roughening processing is performed on the center housing 2 and the plate 14, the chemical processing is performed and chemical joining is performed at the same time as when the insert molding is performed to cause the resin to flow to the groove portions formed by the roughening processing. Therefore, a flow passage of cooling liquid of higher airtightness can be formed.

In this embodiment, the insert molding is used. However, the same effect is obtained even in transfer molding. In addition, a thermosetting resin may be used as the resin 15. As a material of the resin 15, an epoxy resin having high heat resistance is preferable.

In this embodiment, the boundary portion of the center housing 2 and the plate 14 can be easily closed by the resin molding and the airtightness can be secured. In addition, a degree of freedom of the resin 15 is high and the airtightness can be easily adjusted and improved by a thickness of the resin, for example.

In this embodiment, the open surface of the flow passage portion 13 of the cooling liquid of the center housing 2 is formed on the front side. However, the same effect is obtained even when the open surface is provided on the rear side.

As described above, according to this embodiment, the flow passage of the cooling liquid can be formed more easily by the resin molding and the center housing 2 including a cooling flow passage in which productivity is high and a manufacturing cost is low can be realized. In addition, roughening processing or the chemical processing is performed on the center housing 2 and the plate 14. As a result, a flow passage of cooling liquid of nigh airtightness can be formed and a nigh-quality liquid cooling type rotating electrical machine can be realized.

Third Embodiment

Another embodiment of the present invention will be described using FIGS. 11 and 12. Explanation of the same portion as the configurations described in the first and second embodiments is omitted.

In the first and second embodiments, a structure (single-side open structure) where an annular groove which becomes a part of a flow passage 13 of cooling liquid of a center housing 2 and in which a side of one direction of an axial direction becomes an open surface is formed, a plate 14 is disposed to cover the open surface, and the groove of the center housing 2 becomes a sealed space and becomes the flow passage 13 of the cooling liquid was described.

However, in the single-side open structure, the depth of the groove of the flow passage portion of the center housing 2 is limited in the production of aluminum die-cast. Therefore, in this embodiment, a structure (both-end open structure) in which both ends are penetrated is used, the depth of the groove increases to about two times with respect to the single-side open structure, and it is possible to correspond to a rotating electrical machine having a long axial length.

Figure 11:
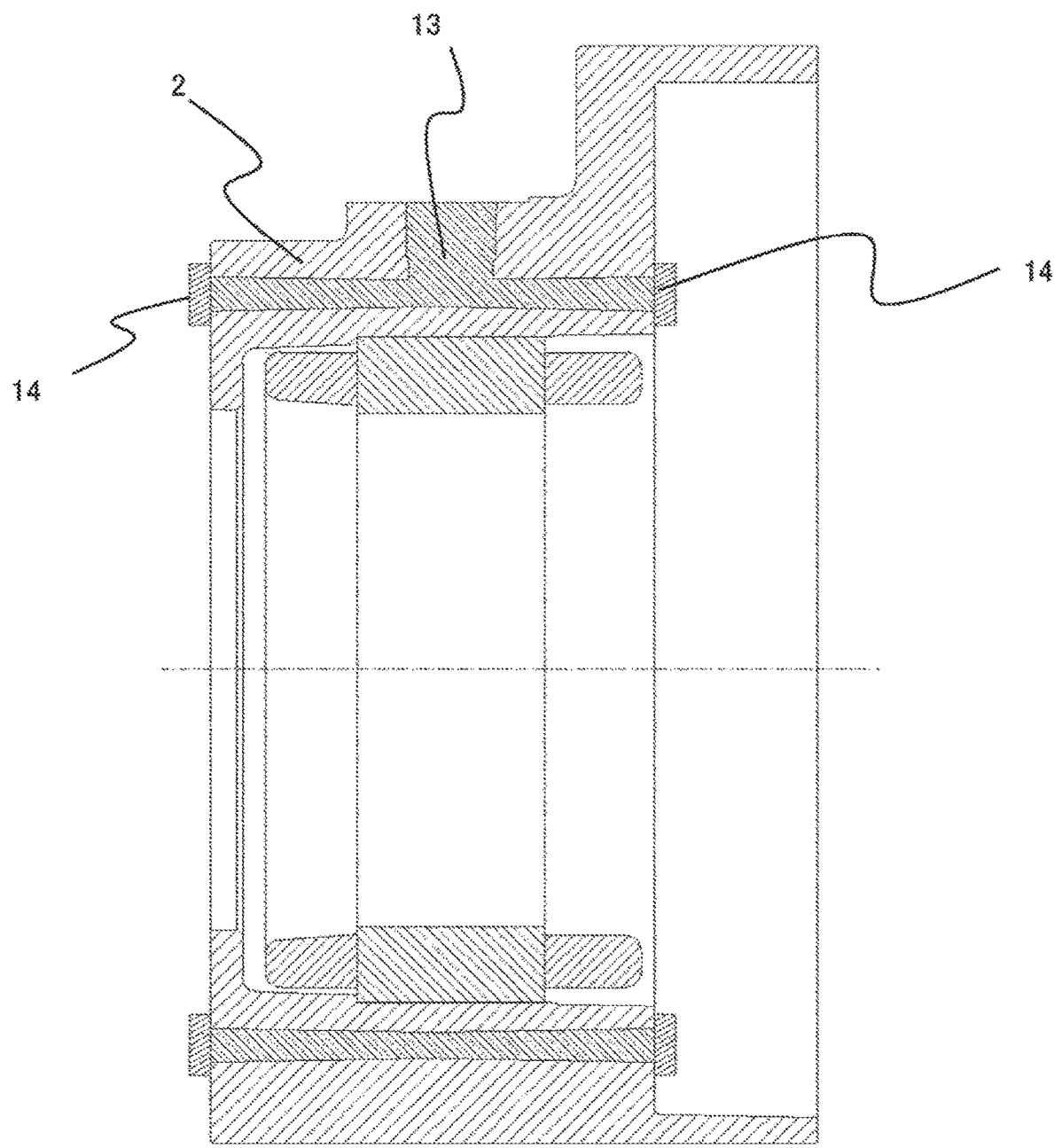
FIG. 11 is a cross-sectional view of a center housing according to a third embodiment.
Figure 12:
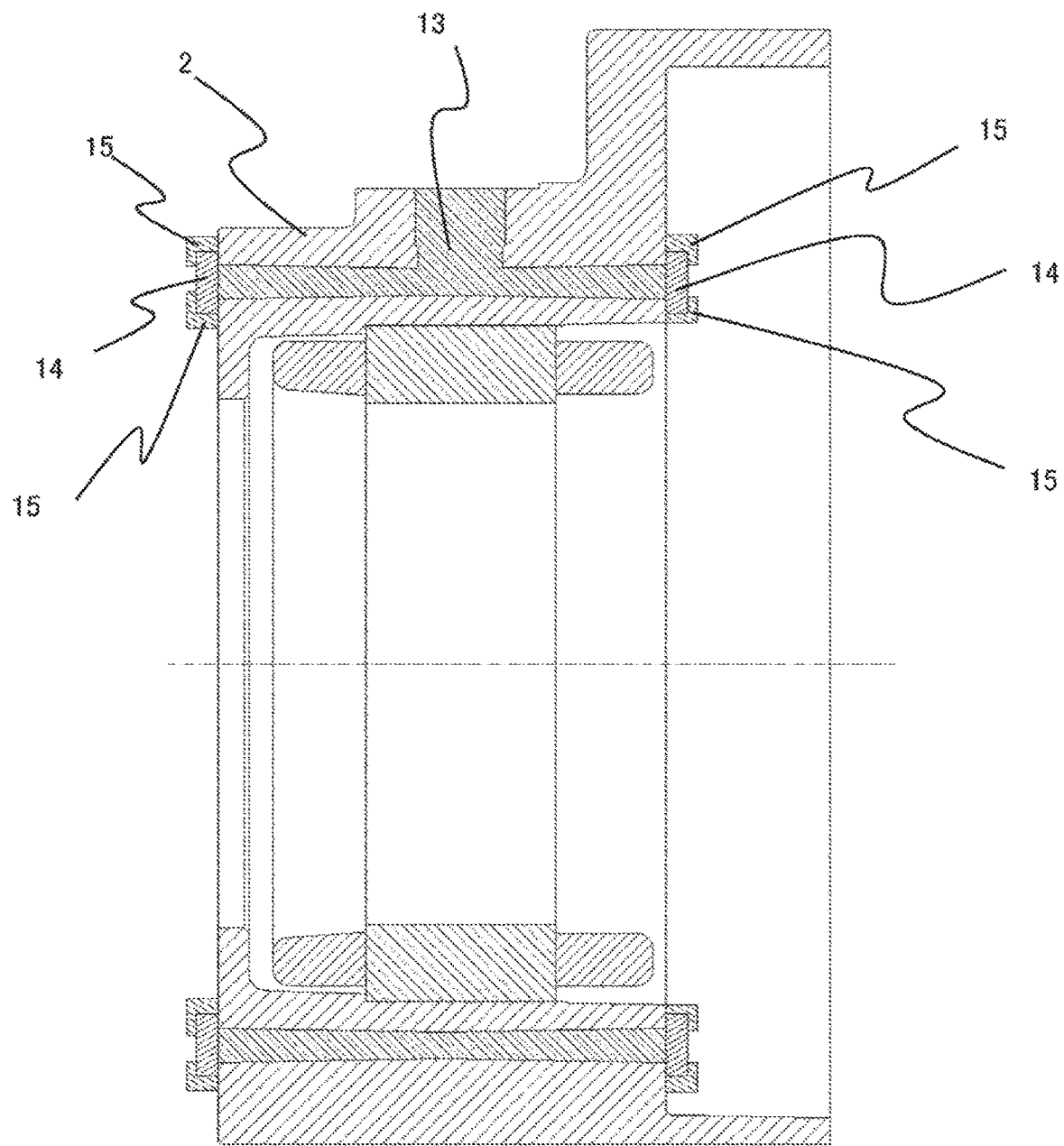
FIG. 12 is a cross-sectional view in resin joining of the center housing according to the third embodiment.

As illustrated in FIGS. 11 and 12, the flow passage 13 of the cooling liquid can be configured to be interposed by the plates 14 from both end faces of the center housing 2. When the plate 14 and the center housing 2 are joined, a method using welding or an adhesive material described in the first embodiment may be used as illustrated in FIG. 11 and a method of performing roughening processing on surfaces (joining surfaces with a resin 15) of the center housing 2 and the plate 14 and performing insert molding of the resin 15, described in the second embodiment, may be used as illustrated in FIG. 12. As a result, similarly to the first and second embodiments, airtightness of the plate 14 and the center housing 2 can be easily secured and the center housing 2 including a cooling flow passage in which productivity is high and a manufacturing cost is low can be realized.

A draft of the flow passage 13 of the cooling liquid is provided such that a center portion of an axial direction is narrowed and both ends of the axial direction are widened. As a result, a surface area of the flow passage can be increased as compared with the first and second embodiments and cooling efficiency can be improved.

As described above, according to this embodiment, cooling can be efficiently performed and it is possible to correspond to a rotating electrical machine having a long axial length.

In each embodiment described above, the driving motor is described as an example. However, the same effect is obtained even in a generator. For example, a liquid cooling type structure of an alternating-current generator for a vehicle is also the same. In the case of the alternating-current generator for the vehicle, a stator is cooled and a control board such as a rectifier and an IC regulator is cooled by liquid cooling.

In addition, the same application is enabled even in integration of an inverter and a motor, simplification of a configuration of a water passage of cooling water and improvement of a degree of freedom can be realized, and the stator and the inverter can be cooled at the same time.

The present invention is not limited to the embodiments described above and various modifications are included in the present invention. For example, the embodiments are described in detail to facilitate the description of the present invention and the present invention is not limited to embodiments in which all of the described configurations are included. In addition, a part of the configurations of the certain embodiment can be replaced by the configurations of another embodiment, or the configurations of another embodiment can be added to the configurations of the certain embodiment. In addition, for a part of the configurations of the individual embodiments, addition, removal, and replacement of other configurations can be performed.

REFERENCE SIGNS LIST

1 rotating electrical machine
2 center housing
3 front bracket
4 rear bracket
5 stator
6 stator core
7 stator winding
8 rotor
9 rotor core
10 shaft
11 front bearing
12 rear bearing
13 flow passage of cooling liquid
14 plate
15 resin
16 welding portion of outer circumferential side of plate and center housing
17 welding portion of inner circumferential side of plate and center housing
18 joining surface of outer circumferential side of plate and center housing
19 joining surface of inner circumferential side of plate and center housing

The invention claimed is:
1. A rotating electrical machine, comprising:
a housing which is provided with a part of a flow passage of cooling liquid;
a stator which is disposed on an inner circumferential side of the housing and includes a stator winding;
a rotor which is rotatably supported to an inner circumferential side of the stator with a gap between the stator and the rotor; and
a bracket fixed to the housing and for attachment to the outside, wherein
the flow passage of the cooling liquid includes a first portion perpendicular to a rotational axis of the rotor and a second portion parallel to the rotational axis of the rotor, the second portion including an annular groove having an open surface on at least one side of an axial direction of the housing and a plate provided to cover the open surface,
the housing and the plate are joined by welding or an adhesive material, and
the bracket and the plate are fixed to the housing without contacting each other, and
in the direction perpendicular to the rotational axis of the rotor, the annular groove is wider at the open surface than at an outer edge of the second portion of the flow passage.
2. The rotating electrical machine according to claim 1, wherein
the annular groove has open surfaces on both ends of the axial direction of the housing and plates provided to cover both of the open surfaces.

3. A rotating electrical machine, comprising:
a housing which is provided with a part of a flow passage of cooling liquid;
a stator which is disposed on an inner circumferential side of the housing and includes a stator winding;
a rotor which is rotatably supported to an inner circumferential side of the stator with a gap between the stator and the rotor; and
a bracket fixed to the housing and for attachment to the outside, wherein
the flow passage of the cooling liquid includes a first portion perpendicular to a rotational axis of the rotor and a second portion parallel to the rotational axis of the rotor, the second portion including an annular groove having an open surface on at least one side of an axial direction of the housing and a plate provided to cover the open surface,
the housing and the plate are joined by a resin,
the bracket and the plate are fixed to the housing without contacting each other, and
in the direction perpendicular to the rotational axis of the rotor, the annular groove is wider at the open surface than at an outer edge of the second portion of the flow passage.

4. The rotating electrical machine according to claim 3, wherein
the annular groove has open surfaces on both ends of the axial direction of the housing and plates provided to cover both of the open surfaces.

5. The rotating electrical machine according to claim 3, wherein
a boundary portion of the housing and the plate is covered with the resin.

6. The rotating electrical machine according to claim 5, wherein
a part of an end face of the axial direction of the plate is covered with the resin.

7. The rotating electrical machine according to claim 6, wherein
at least one of roughening processing and chemical processing is performed on surfaces of the housing and the plate contacting the resin.

8. The rotating electrical machine according to claim 7, wherein
the roughening processing is performed on the surfaces of the housing and the plate contacting the resin and the chemical processing is performed on the surfaces subjected to the roughening processing.

* * * * *